(12) United States Patent
Keightley

(10) Patent No.: US 9,550,237 B2
(45) Date of Patent: Jan. 24, 2017

(54) CHUCK TOOL AND BITS

(76) Inventor: Kym Keightley, Fairview Park (AU)

( * ) Notice: Subject to any disclaimer, the term of this patent is extended or adjusted under 35 U.S.C. 154(b) by 499 days.

(21) Appl. No.: 14/113,102

(22) PCT Filed: Apr. 23, 2012

(86) PCT No.: PCT/AU2012/000428
§ 371 (c)(1),
(2), (4) Date: Jan. 13, 2014

(87) PCT Pub. No.: WO2012/142679
PCT Pub. Date: Oct. 26, 2012

(65) Prior Publication Data
US 2014/0183827 A1 Jul. 3, 2014

(30) Foreign Application Priority Data

Apr. 21, 2011 (AU) .................... 2011901515

(51) Int. Cl.
*B23B 51/12* (2006.01)
*B23B 31/00* (2006.01)
(Continued)

(52) U.S. Cl.
CPC ............. *B23B 51/12* (2013.01); *B23B 31/005* (2013.01); *B23B 31/008* (2013.01);
(Continued)

(58) Field of Classification Search
CPC .. Y10T 408/907; Y10T 408/94; Y10T 408/95; Y10T 408/953; Y10T 408/957; Y10T 279/17761; Y10T 279/17786; Y10T 279/3418; Y10T 279/17752; B23B 2231/0232; B23B 2231/0244; B23B 2231/0228; B23B 2231/022; B23B 2231/0268; B23B 2231/04; B23B 51/12; B23B 31/107; B23B 31/1074; B23B 31/1173

See application file for complete search history.

(56) References Cited

U.S. PATENT DOCUMENTS 247,035 A * 9/1881 Gage .................. B23B 31/1253
                                                  279/60
1,938,440 A * 12/1933 Clement ................ B21D 28/34
                                                  279/30

(Continued)

FOREIGN PATENT DOCUMENTS

DE        2524340 A1 * 12/1976 ............. B23B 51/10
DE        2822372 A1 * 11/1979 ........... B25B 21/007
WO     2006122417      11/2006

*Primary Examiner* — Sunil K Singh
*Assistant Examiner* — Yasir Diab
(74) *Attorney, Agent, or Firm* — Sand & Sebolt

(57) ABSTRACT

A tool arrangement and chuck apparatus for quick change of a range of tools; particularly, a quick change chuck adapted to engage various diameter drill bits, tools and tool holders. The tools are rotatable in a chuck or adaptor and have at one end a centering shaft portion having a constant diameter for multiple tool end diameters and shapes, a drive shoulder portion and a lock portion. The chucks have a tool centering arrangement for accommodating the constant diameter centering shaft. The chucks are also described as having tool bit release mechanism operable to disengage the tool from a retention mechanism when a force is applied inwards of the body of the chuck by the user to allow the tool bit to be removed longitudinally from the chuck but also arrange to allow the tool bit to be inserted longitudinally into the chuck without requiring any other user operation.

14 Claims, 23 Drawing Sheets

(51) Int. Cl.
  *B23Q 3/12* (2006.01)
  *B25B 23/00* (2006.01)
  *B23B 31/107* (2006.01)
  *B23B 47/00* (2006.01)
  *B23B 51/00* (2006.01)

(52) U.S. Cl.
  CPC .......... *B23B 31/1071* (2013.01); *B23B 47/00* (2013.01); *B23B 51/00* (2013.01); *B23Q 3/12* (2013.01); *B25B 23/0035* (2013.01); *B23B 2231/0232* (2013.01); *B23B 2231/0256* (2013.01); *B23B 2231/0268* (2013.01); *B23B 2231/04* (2013.01); *Y10T 279/17* (2015.01); *Y10T 279/17196* (2015.01); *Y10T 279/3418* (2015.01); *Y10T 408/907* (2015.01); *Y10T 408/957* (2015.01)

(56) References Cited

U.S. PATENT DOCUMENTS

| | | | | |
|---|---|---|---|---|
| 5,033,920 A | * | 7/1991 | Cantanese | B23B 31/005 279/97 |
| 5,415,501 A | * | 5/1995 | Mariani | B23B 41/02 279/20 |
| 5,967,709 A | * | 10/1999 | Thuesen | B23B 51/0426 408/204 |
| 6,270,085 B1 | | 8/2001 | Chen et al. | |
| 6,311,989 B1 | * | 11/2001 | Rosanwo | B25B 15/001 279/75 |
| 6,572,311 B2 | * | 6/2003 | Vasudeva | B23B 31/005 408/226 |
| 7,175,372 B2 | * | 2/2007 | Davis | B23B 31/4073 408/204 |
| 7,726,664 B2 | * | 6/2010 | Peters | B23B 31/005 279/143 |
| 2004/0076483 A1 | | 4/2004 | Singh et al. | |
| 2004/0081523 A1 | * | 4/2004 | Vasudeva | B23B 31/005 408/240 |
| 2007/0020057 A1 | | 1/2007 | Chen | |
| 2009/0026718 A1 | * | 1/2009 | Krondorfer | B23B 31/1071 279/30 |
| 2010/0322730 A1 | * | 12/2010 | Keightley | B23B 51/0426 408/204 |

* cited by examiner

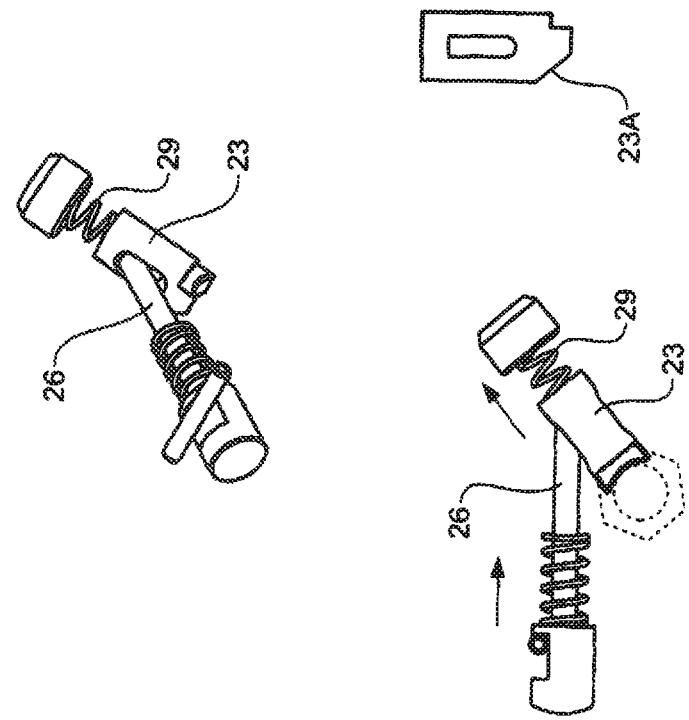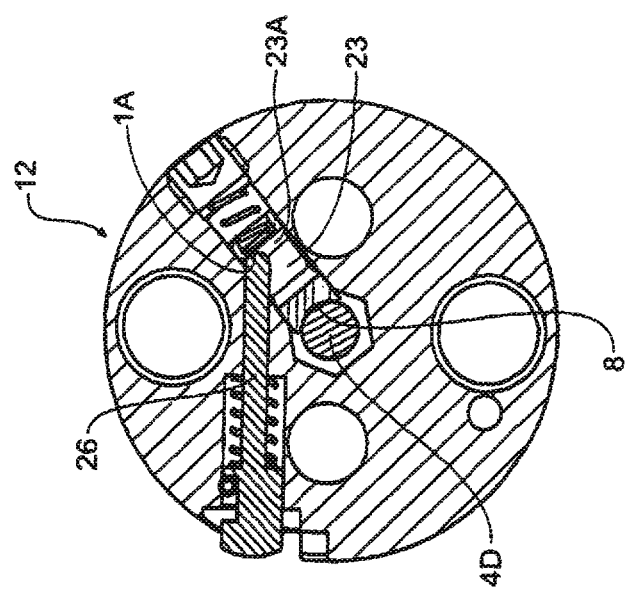
Figure 16

CHUCK TOOL AND BITS

FIELD OF THE INVENTION

The present invention relates to a tool arrangement and chuck apparatus for quick change of a range of tools. In particular, a quick change chuck adapted to engage various diameter drill bits, tools and tool holders.

REFERENCE

Incorporated by reference into this specification is Australian provisional patent application 2011901515 dated 21 Apr. 2011 entitled Chuck Tool and Bits Arrangement having the same inventor as the subject application.

BACKGROUND OF THE INVENTION

Chucks used to rotationally support tools are commonly known. Chucks are usually attached to a power drill and are generally of the 3 jaw type which are adjustable to allow clamping of different diameter tool shanks. Drill bits are most commonly clamped in a chuck and are typically long and cylindrically shaped, having a round shank at one end for mounting in a chuck and at the opposite end a cutting face. Drill bits vary in diameter depending on the size hole to be drilled and are commonly available in very small diameters through to larger diameters.

A problem when using chucks to clamp a drill bit is slip. This occurs during the drilling process as the chuck jaws tend to slip around the shank causing damage. This results in both salient and recessed radial grooves on the shank which can cause operational problems including out of true rotation and weakening of the shank. Chucks can also over tighten and jam closed making release of the chuck and drill bit removal difficult continually operating a chuck is also time consuming with drill bit changeovers.

Other drill bits have hexagonal shanks which may be inserted into a corresponding hexagonal cavity of a mandrel. The mandrel fits into a three jaw chuck and the hexagonal cavity in the mandrel both supports the drill bit and acts as a rotational drive means. Although useful in connecting drill bits without having to operate a three jaw chuck each time, the arrangement is prone to run-out. Run-out occurs as the drill bit experiences radial variation along its longitudinal axis during rotation.

This is seen by the user as rotational wobble from side to side when looking along the length of the drill bit this wobble makes it difficult for a user to drill a hole accurately when drilling into various materials, in particular metals. Drill bit starts are also very difficult into for example sheet metal.

One of the main reasons for this run-out is that hexagonal shafts and bores are generally mass produced and the accuracy in regard to straightness along their length as well as dimensional accuracy is difficult to maintain compared to round bores and shafts. This lack of straightness of the bore and shaft as well as play between the bore and shaft when fitted together, result in levels of run-out that, whilst acceptable for some tools, is an unacceptable level of run-out for drills, as any run-out of the mandrel is amplified across the longer length of a drill resulting in large run-out at the drill cutting face.

A further problem is that hex chucks accept only one size shank. This is generally [¼]" which is suitable for drills of smaller diameter. Larger diameter drills require heavier rotational forces and support making the [¼]" shaft inadequate. One could have two chucks to adapt to two different shank sizes, one chuck for smaller diameter drills and another chuck for larger diameter drills but this would require changeover of chucks which is cumbersome.

What is needed therefore is a quick change chuck assembly and suitable tools which overcomes one or more of the aforementioned problems and provides the public with a useful alternative.

SUMMARY OF THE INVENTION

Therefore in one form of the invention there is proposed a drill bit arrangement including, a body having at a first end a cutting face associated with a drilling portion of the body; and at a second end having at least one of the following in any order: a centering shaft portion having a constant diameter for multiple drilling portion diameters; a drive shoulder portion; and a lock portion.

Preferably the drive shoulder portion is of a predetermined size which depends on the drilling portion diameter.

Further preferably the drive shoulder portion is hexagonal in cross-section.

Yet further preferably the drive shoulder portion is a smaller hexagonal cross-section for smaller diameter drill bits and a larger hexagonal cross-section for larger diameter drill bits.

In a further aspect of the invention there is a chuck for use with a drill bit as described herein in, the chuck including: a body; a drill bit centering arrangement for accommodating the constant diameter centering shaft portion of the drill bit, wherein the drill bit is aligned with the axis of rotation of the chuck to reduce run-out; and a drill bit retention arrangement adapted to engage with the lock portion of the drill bit preventing relative longitudinal movement between the drill bit and the body of the chuck. And a drill bit engagement portion of the chuck for engaging the drive shoulder portion of a drill bit to impart rotational forces to the drill bit.

Preferably the drill bit engagement portion is adapted to accommodate at least two differently sized drive shoulder portions of different drill bits, Further preferably the drill bit release mechanism associated with the drill bit retention arrangement operable to disengage the drill from the retention arrangement when a force is applied inwards of the body by a user of the chuck and drill bit, to allow the drill bit to be removed longitudinally from the chuck. In yet a further aspect of the invention a chuck and drill bit adapter for use with a drill bit, as described herein, the chuck includes; a body; a retention element adapted to engage with the lock portion of a drill bit and prevent relative longitudinal movement between the drill bit and the chuck body, a bore coaxially aligned with the chuck body and adapted to accommodate the centering shaft portion of the drill bit; and the adapter includes a drill bit engagement portion for engaging the drive shoulder portion of a drill bit and to impart rotational forces to the drill bit.

Preferably the chuck and drill bit adapter wherein the drill bit engagement portion is adapted to accommodate at least two differently sized drive shoulder portions of different drill bits.

In a further aspect of the invention a drill bit adapter for use with either the chuck described herein and/or the adaptor described herein, the tool bit adapter includes: a body having a first end for use with the chucks as claimed, for transferring rotational energy to the body, the second end of the body adapted to accommodate and secure different diameter tool bits having a cylindrical end for insertion and securement within the second end of the body of the adaptor, wherein the tool bit has a free working end having one of the ends of a group of ends including, a drilling portion end, a screw bolt head engaging end, a rotating abrasive end, and a buffing end.

BRIEF DESCRIPTION OF THE DRAWINGS

The accompanying drawings, which are incorporated in and constitute a part of this specification, illustrate several implementations of the invention and, together with the description, serve to explain the advantages and principles of the invention. In the drawings:

FIG. 16 is a cut-away view of the pushbutton lock mechanism and some of its parts according to an embodiment of the invention;

DESCRIPTION OF THE PREFERRED EMBODIMENTS

The following detailed description of the invention refers to the accompanying drawings. Although the description includes exemplary embodiments, other embodiments are possible, and changes may be made to the embodiments described without departing from the spirit and scope of the invention.

Figure 1:
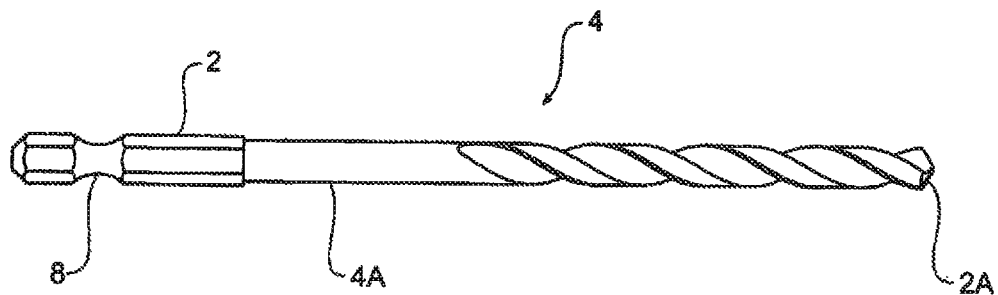
FIG. 1 is side view of a prior art hex shank drill.

FIG. 1 shows a commonly available prior art quick change drill bit having an approximately ¼" hexagonal shank 8 and a locking groove 2 extending around the shank 4A. A cutting face 2A is at the opposite end. The hexagonal shank 8 acts as a drive shoulder to allow rotational engagement of the drill bit by the chuck. Typically a ball detent will act on the groove 8 to prevent the bit pulling out during use.

A problem with this arrangement is the hex drive means is also the centering means which cannot be turned to be formed during manufacture. Each flat must be machined, ground or formed by forging resulting in run-out problems as discussed earlier in the specification.

Figure 3:
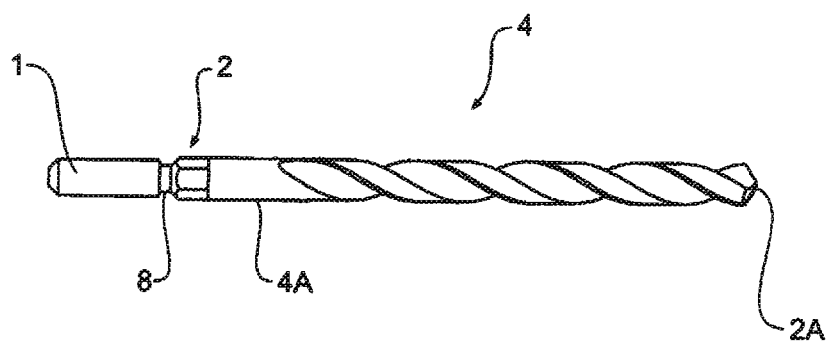
FIG. 3 is a side view of a drill with a centering shaft, lock portion and a drive shoulder portion according to an embodiment of the invention.

FIG. 3 shows one embodiment of the present invention. Shown in the figure is a drill bit 4 having a cylindrical centering shaft 1 extending from the center of a shank 4A. A drive shoulder 2 in the form of a hexagonal shoulder extends around the circumference of the shank. A groove 8 also extends around the shank 4A referred to as a lock portion.

Figure 11:
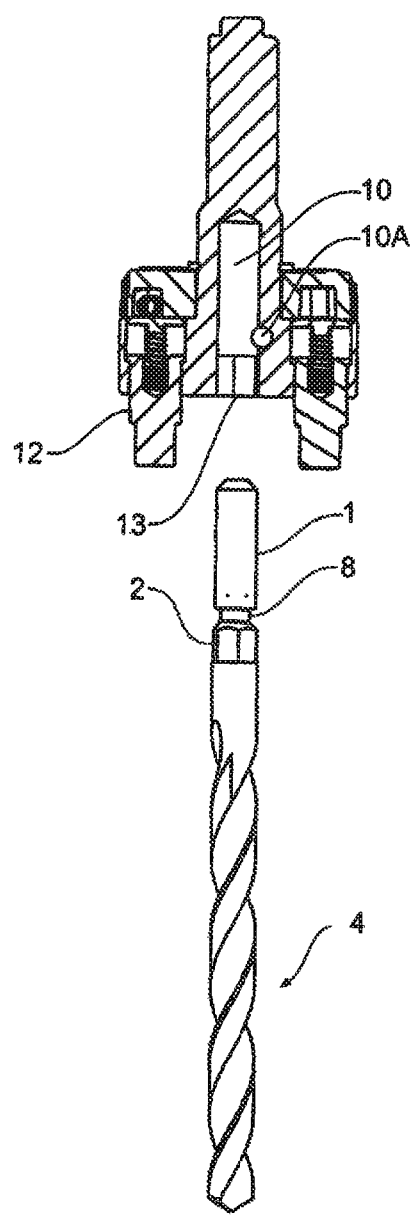
FIG. 11 is a sectional view of a drill bit, and a mandrel according to yet further forms of the invention.

FIG. 11 shows a chuck 12 (sometimes referred to herein as a quick change chuck) with a bore 10 adapted to receive centering shaft 1 and a hexagonal bore shoulder 13 that engages hexagonal shoulder 2 of the drill bit 4. A locking and unlocking member 10A prevents in one operation the bit from moving longitudinally out of the chuck by abutting a portion of the inside of the groove 8.

Unlike the drill bit in FIG. 1, the hexagonal shoulder 2 is limited in length and thus is used for driving the bit only, not centering. The shank comprises a centering shaft 1 which when inserted into bore 10, aligns the chuck 12 and drill bit 4 to hold the bit 4 rotationally true so as to minimize or eliminate runout.

The advantage of this arrangement is that centering shaft 1 and bore 10 are shapes that can be rapidly mass produced and dimensionally controlled with respect to diameter size (various predetermined sizes can be made) and straightness.

A further advantage of this arrangement is that drill bits of standard length may be quick changed and operated with high levels of rotational concentricity so as to minimize or eliminate runout, since the portion of the drill bit that is used to center the drill bit in the chuck is of a predetermined diameter and the portion of the chuck can be sized to accommodate that predetermined diameter with as much accuracy as desired in the relevant manufacturing environment.

Figure 5:
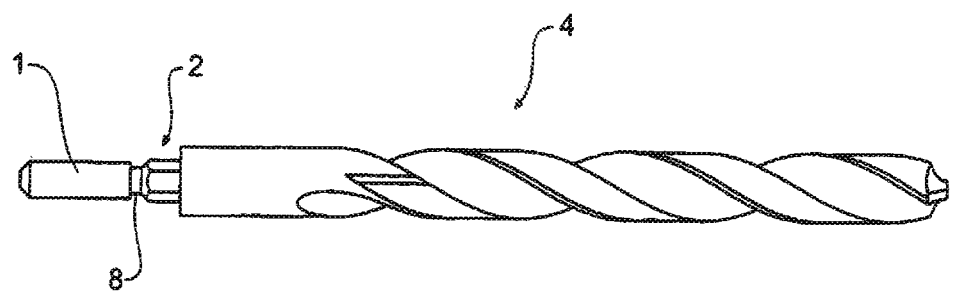
FIG. 5 is a side view of a drill with a centering shaft and a drive shoulder portion showing the a variations of a drive member diameter compared to FIG. 4.
Figure 6:
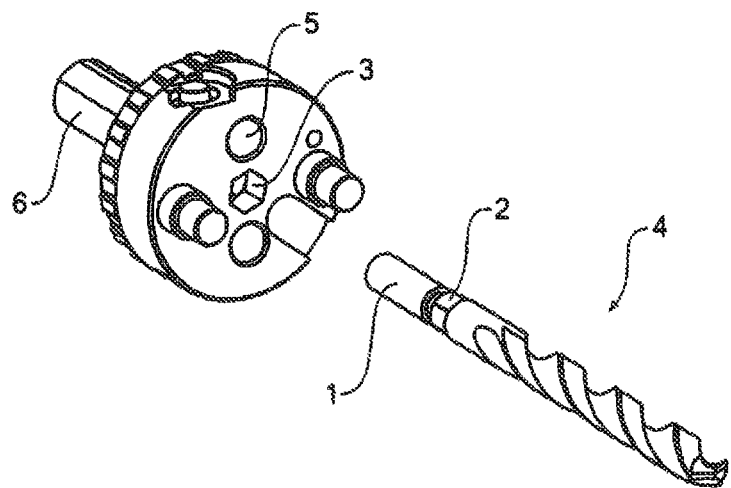
FIG. 6 is an isometric view of a drill and mandrel according to an embodiment of the invention.
Figure 7:
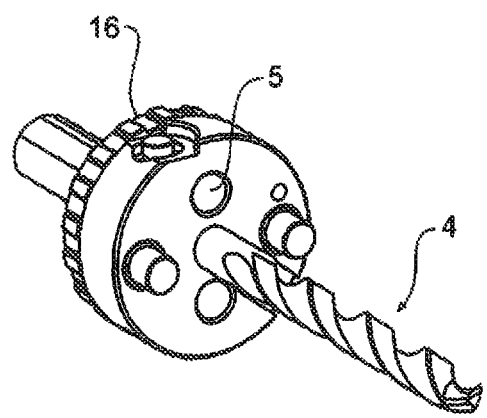
FIG. 7 is an isometric view of a mandrel according to an embodiment of the invention with an inserted drill bit.

A further disadvantage of the drill bit in FIG. 1 is that the hexagonal diameter is limited to smaller diameter drills and is not strong enough to drive larger diameter drills. FIG. 5 shows drive shoulder 2 of smaller diameter on a larger diameter drill 4 which, if this is chosen as the common hexagonal size on all drill bits to fit the chuck 12 for all drill diameters, then it will not be strong enough on the larger diameter drill.

Figure 4:
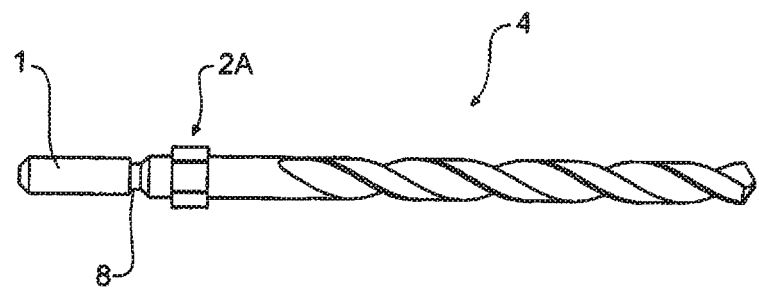
FIG. 4 is a side view of a drill with a centering shaft, lock portion and a drive showing a variation of a drive shoulder portion diameter.

A hexagonal drive of larger diameter may be used on all drill bits as can be seen in FIG. 4, which provides more strength on larger diameter drill bits.

However the smaller diameter drill bits become uneconomical to manufacture due to increased material and grinding costs. This is because the material required to manufacture the drill bit must be at least the outer diameter of the shoulder 2A if the drill bit is to be manufactured from one piece of steel.

Figure 2:
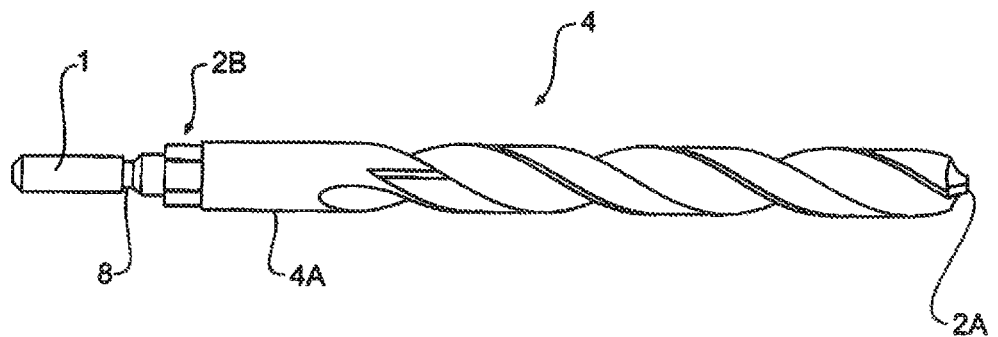
FIG. 2 is a side view of a drill with a centering shaft, lock portion and a drive shoulder portion according to an embodiment of the invention.

To solve this problem two optimally sized hexagonal shoulders are selected for a range of drill diameters up to [½]". This is shown in FIGS. 2 and 3. As can be seen the centering shaft 1 and groove 8 remains common for both hex sizes 2 and 2A.

Figure 8:
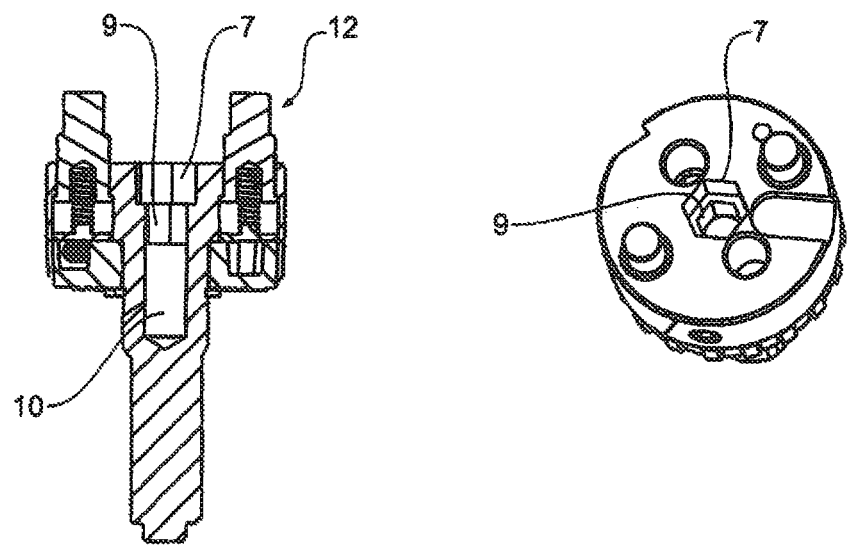
FIG. 8 is a sectional view of a mandrel according to one form of the invention and an adjacent top view of the mandrel.

FIG. 8 shows a mandrel 12 with a bore 10 adapted to receive centering shaft 1 of the drills in FIGS. 2 and 3. The bore 10 further has two hexagonal shoulders 7 and 9 to engage hexagonal shoulders 2 or 2A of the drills in FIGS. 2 and 3.

Figure 9:
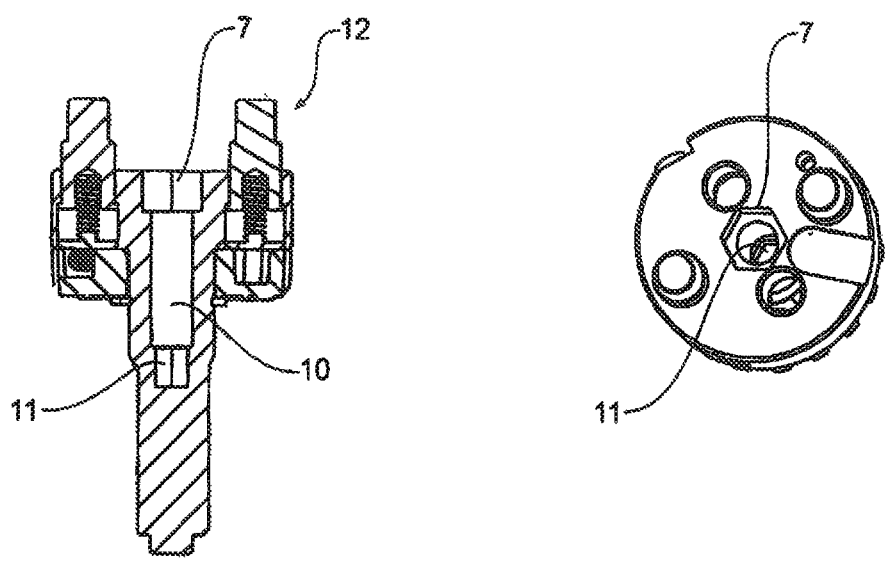
FIG. 9 is a sectional view of a mandrel according to a further form of the invention and an adjacent top view of the mandrel.
Figure 10:
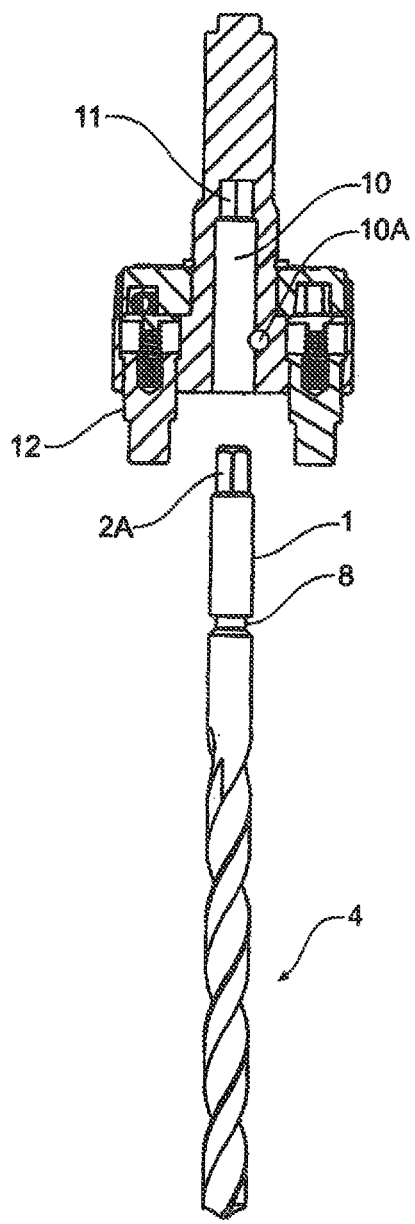
FIG. 10 is a sectional view of a drill bit, and a mandrel according to yet further forms of the invention.

FIGS. 9, 10 and 11 show embodiments of this present invention having two hexagonal shoulders 7 (FIG. 9) and 11 (FIGS. 9, 10 and 11) at ends of the bore 10. FIG. 10 shows shoulder 11 engages hexagonal 2A for smaller diameter drills and FIG. 11 shows shoulder 3 engages hexagonal 22 for larger diameter drills.

Figure 12:
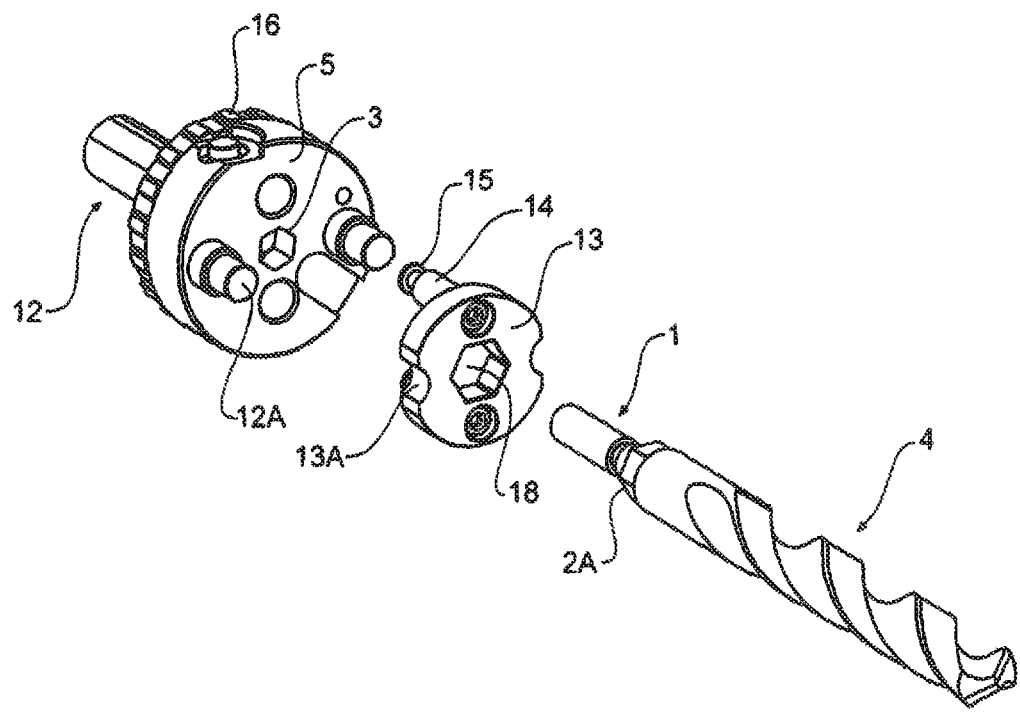
FIG. 12 is an exploded isometric view of a drill, drive member and mandrel according to yet a further form of the invention.
Figure 13:
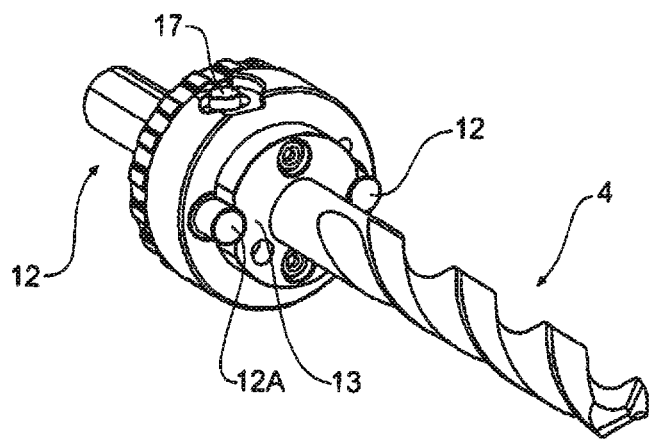
FIG. 13 is an isometric view of a drill, drive member and mandrel in place for use according to yet a further form of the invention.

Another embodiment of this present invention is shown in FIGS. 12 and 13. Here only one hexagonal shoulder diameter 3 is present in the chuck bore 10. This is sized to suit the smaller diameter drill bits hexagonal drive shoulder 2. FIG. 11 shows the shoulder 3 which engages shoulder 2A during insertion of the drill bit 4 into the chuck bore 10 (not shown). To accommodate larger drill bits a drive collar 13 is attached to chuck 12.

The drive collar 12 is secured to the chuck 12 by lock pins 14 which include a shoulder IS that releasably engages lock ring 16 various embodiments of which are described herein. Drive shafts 12A engage shoulder 13A of the collar 13 allowing hexagonal bore 18 to rotate hexagonal shaft 2A of the drill bit FIG. 13 shows the drill bit 4 fully inserted into the chuck 12 and engaged with the drive collar 12. Drive collar 1 also retracts drive shafts 12A to prevent the drive shafts striking the work piece during rotation. Pushbutton 17 releases the drill bit. Drive collar 13 is placed onto the chuck 12 that provides for 2 different hexagonal drive shoulders 3 and 18 to which are sized to fit a range of drill bit diameters from 1 mm to 13 mm employing hexagonal shoulder sizes 2 and 2A. A third drive collar may be employed with a larger hexagonal bore 18 diameter allowing larger drill diameters (beyond 13 mm), with larger hexagonal shoulders to also be quick changed.

Figure 13A:
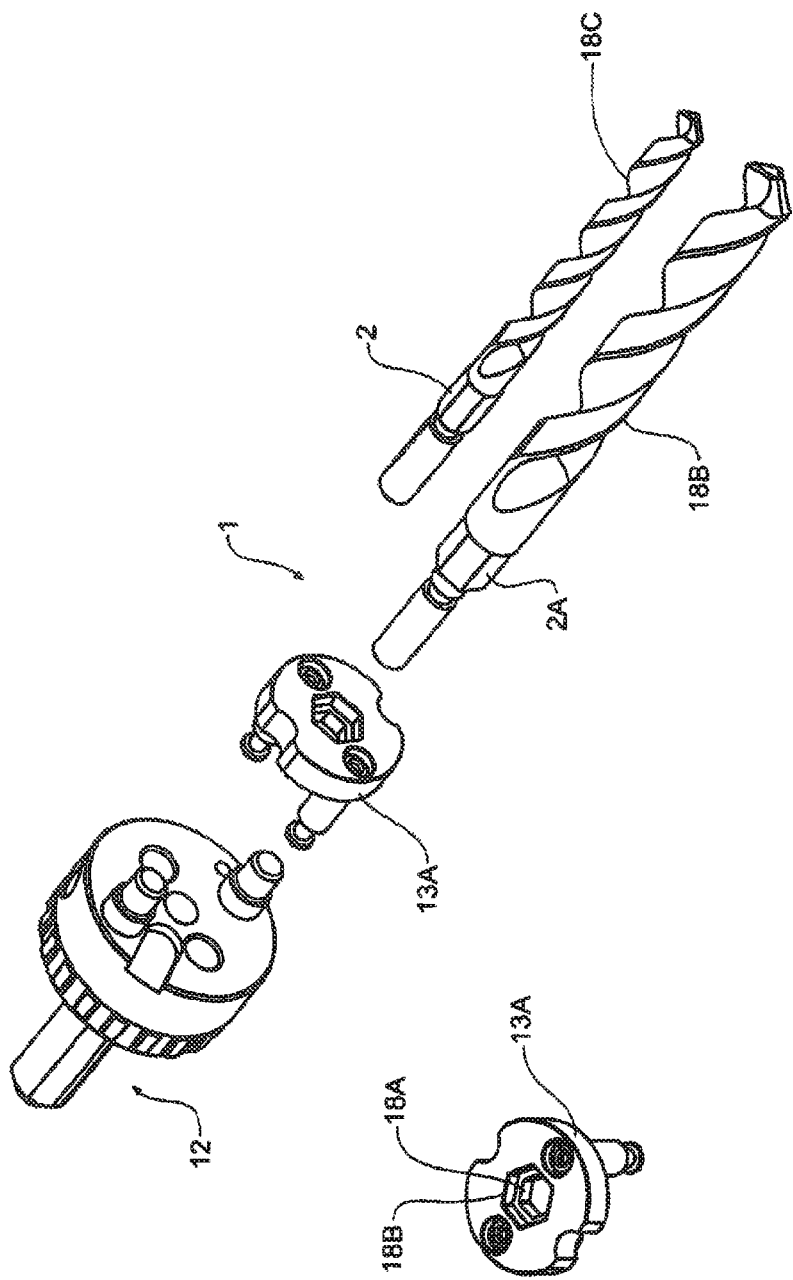
FIG. 13A is an isometric view of a mandrel with an adaptor capable of engaging various diameter drive shoulders of the various drills shown.

FIG. 13A shows a drive collar 13A that has two hexagonal drive shoulders, a first diameter shoulder 18A and a second diameter shoulder 18B.

The drills 18C and 18B both have different diameter drive shoulders 2 and 2A which are engaged by corresponding hexagonal drive shoulders of drive collar 13A. For example it can be seen that drill bit 18C has a smaller diameter drive shoulder 2 which engages with smaller hexagonal drive shoulder 18A when the drill bit is inserted into the arbor 12. Drill Bit 18B has a larger shoulder 2A which engages with larger hexagonal drive shoulder 18B when the drill bit is inserted into the arbor 12.

Figure 14:
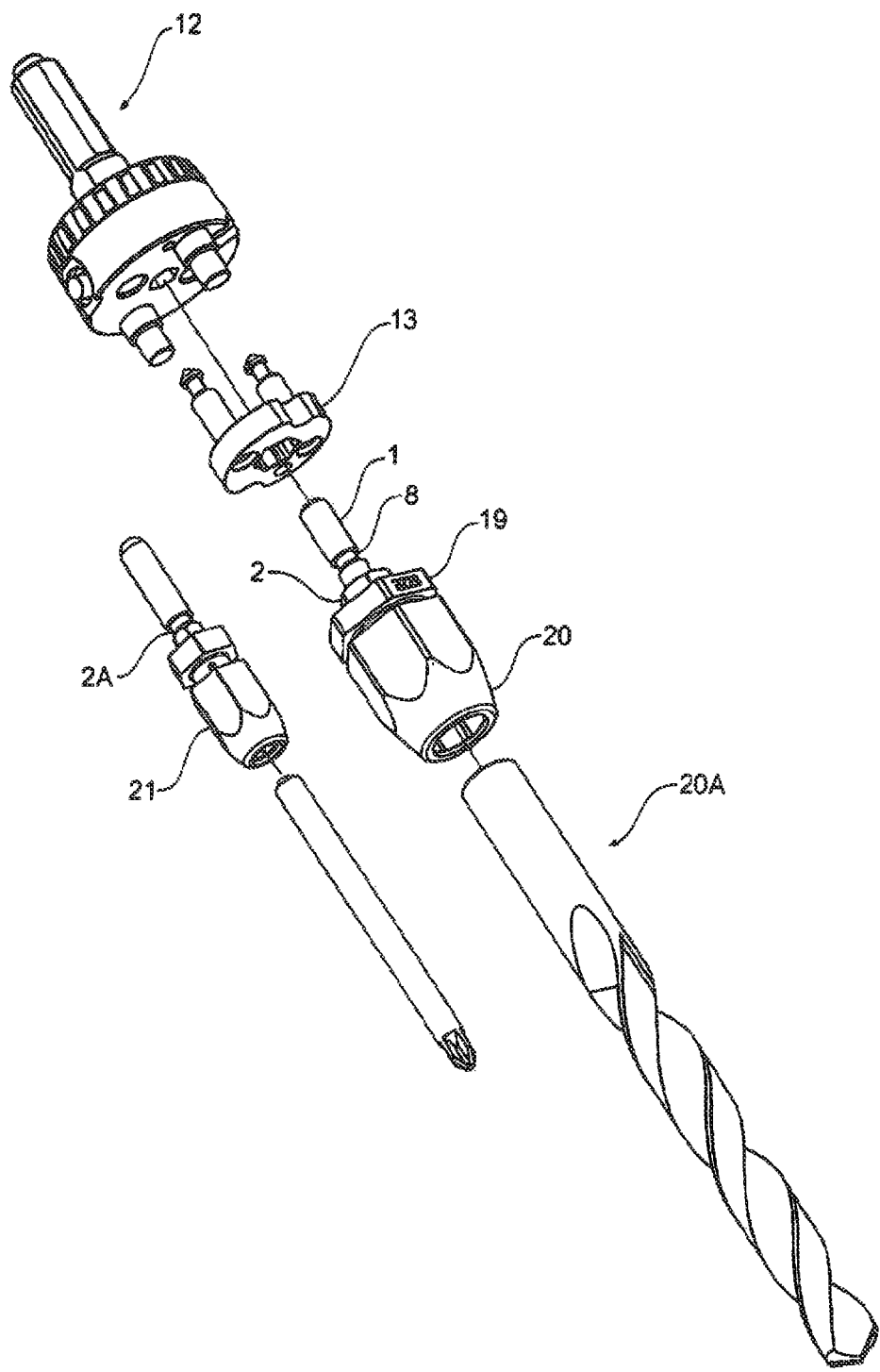
FIG. 14 is an isometric view of a drill, tool holder and mandrel according to yet a further form of the invention.

FIG. 14 shows a further preferred embodiment of the present invention including a drill bit adaptor 19 having a collet 20 for holding a standard drill 20A or other tool. At the opposite end there is a centering shaft 1, a groove 8 and a hexagonal shoulder 2. Collet 21 is the same configuration but with a smaller hexagonal shoulder 2A for smaller tools.

The drill bit adaptor having a body with a first end for use with the chucks as described herein that transfers rotational energy to the body. The drill bit adaptor also having a second end of the body adapted to accommodate and secure different diameter tool bits. The drill bits having a cylindrical end for insertion and securement within the second end of the body of the adaptor.

The tool bit having a free working end having one of the ends of a group of ends including, a drilling portion end, a screw/bolt head engaging end, a rotating abrasive end, and a buffing end.

In the same way as the drill bit 4 in FIGS. 2 and 3 quick change to the chuck 12, the tool holder 19 quick changes also. This provides the benefit of being able to quick change a range of tools to the chuck as well as commonly available drill bits.

Figure 15:
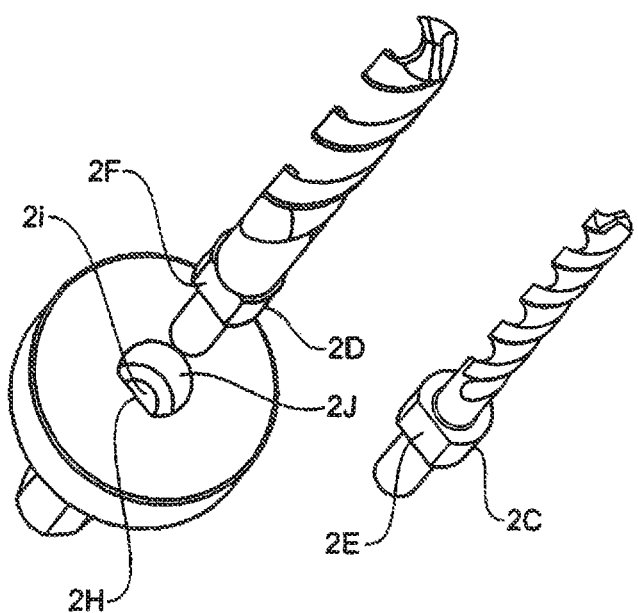
FIG. 15 is an isometric view of a drill and tool holder according to yet a further form of the invention.

FIG. 15 shows an alternate embodiment of the present invention. The hexagonal shoulder diameters 2 and 2A on drill bits 4B and 4C have been substituted for round diameters 2C and 2D with a single shoulder 2B and 2F. Likewise the mandrel 1 has two diameter round bores 2i and 2J with a corresponding flat 2G and 2H to engage the drill shoulders 2E and 2F.

FIG. 16 shows the pushbutton assembly for this embodiment of the invention. A captured pushing member pushbutton shaft 26 operates with a force inwards of the body of the assembly against a bias to return to a first position and when the force is applied inwards of the body of the chuck against the locking member 23 so that radial movement of the button towards the center of the chuck 12 produces radial movement of the locking member out of abutment with the drill bit an away from the center of the chuck thereby releasing the locking member from engagement with the groove 8 of the drill bit 4, that otherwise is biased to abut the lock portion of the drill bit.

A bias member such as for example a spring 29 ensures the locking member 23 is biased towards the lock potion of the drill bit, thus while the drill bit is in place it is locked and restrained from longitudinal movement and retained within the chuck. A chamfer 23A is acted upon by a chamfer 1A to move the locking member 23 from a from abutment with the drill bit locking portion to a second position during insertion of the drill bit 4D into mandrel bore 10 (not shown). The spring 29 biases the member 23 into the groove 8 of the drill 4D to lock the drill into the mandrel. Depressing the button 26 moves lock member 23 from first lock position to towards an unlock position eventually once the drill bit is moved to be extracted to thus allowing the drill bit 4D to be removed.

FIG. 16 also shows an alternative embodiment of the drill bit. The hexagonal shaft 24 that has been rounded at the edges (not shown in detail due to the scale). This rounding effectively provides the outer diameter to act as the centering shaft portion as per the centering portion 1 for drill bit 4 in FIGS. 2 and 3. Hence although it is hexagonal in shape, there is no driving on this hexagonal shoulder and the hexagonal edges have been truncated to provide an outer diameter 25 which is insertable into bore 10 of mandrel 12. This outer diameter 25 acts in the same way as the centering shaft 1.

Figure 17:
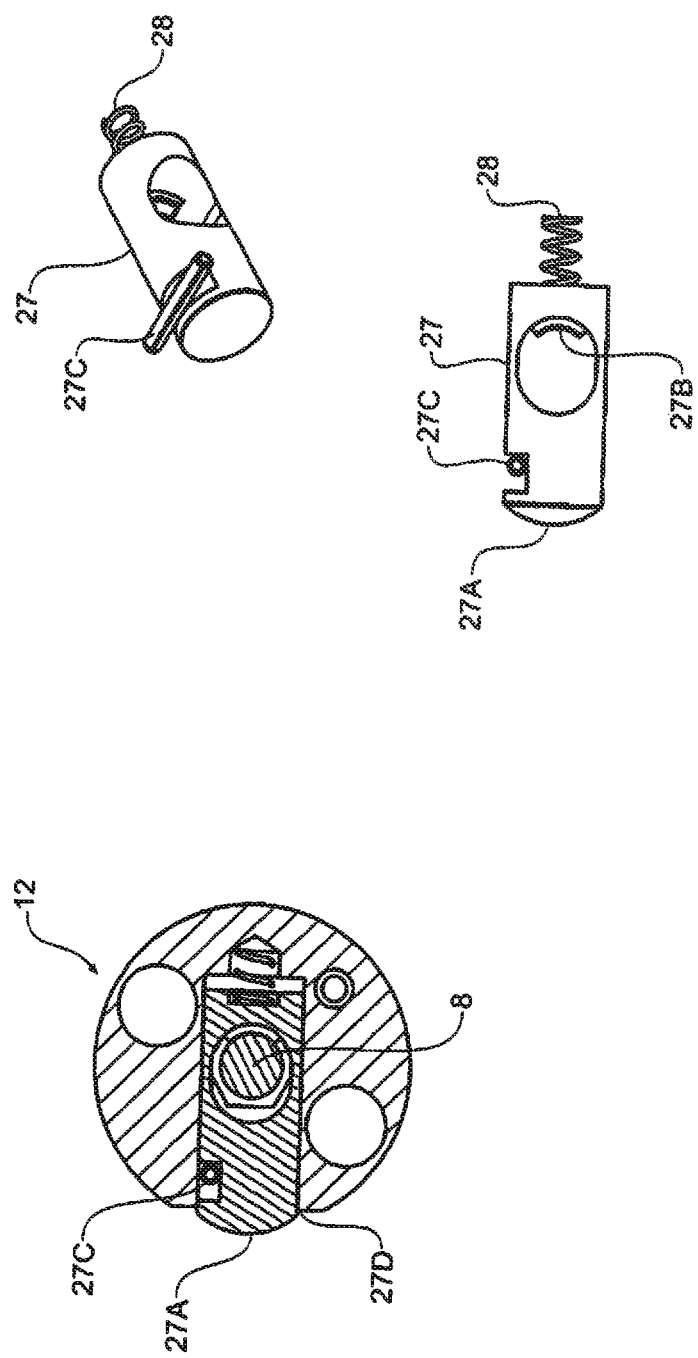
FIG. 17 is a cut-away view of a further pushbutton lock mechanism and some of its parts according to an embodiment of the invention.
Figure 18:
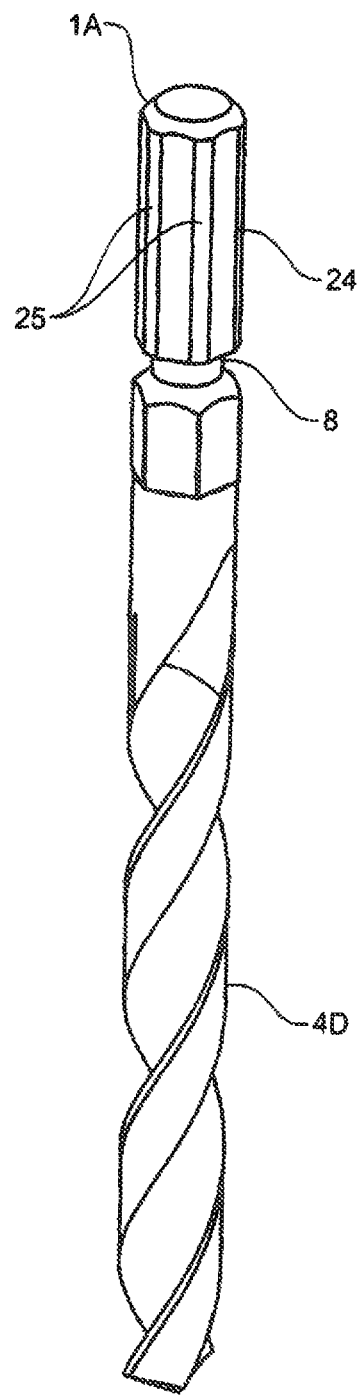
FIG. 18 is an isometric view of a mandrel, drill and drive member according to still yet a further form of the invention.

FIG. 17 shows a further preferred embodiment of the invention. Pressing of the top of a locking member, being in this embodiment a shaft 27A moves the member laterally of the mandrel 12. The locking member 27B also moves away from the center of the mandrel 12. This moves locking member 27B out of engagement with groove 8 of the drill 4D and the drill can be removed.

Thus FIG. 17 shows a locking member 27A biased to abut the lock portion of the drill bit 4D and located within the body 12 so that a drill bit having a lock portion 8 can pass the locking member 27A in one direction but not in the other direction. The locking member is stopped 27C in a position that partially extends 27D the locking member external of the body 12 of the chuck, and when a force is applied to the locking member inwards of the body and against the bias by a user of the chuck and drill bit, the drill bit can be moved in one direction and removed longitudinally from the chuck.

Figure 19:
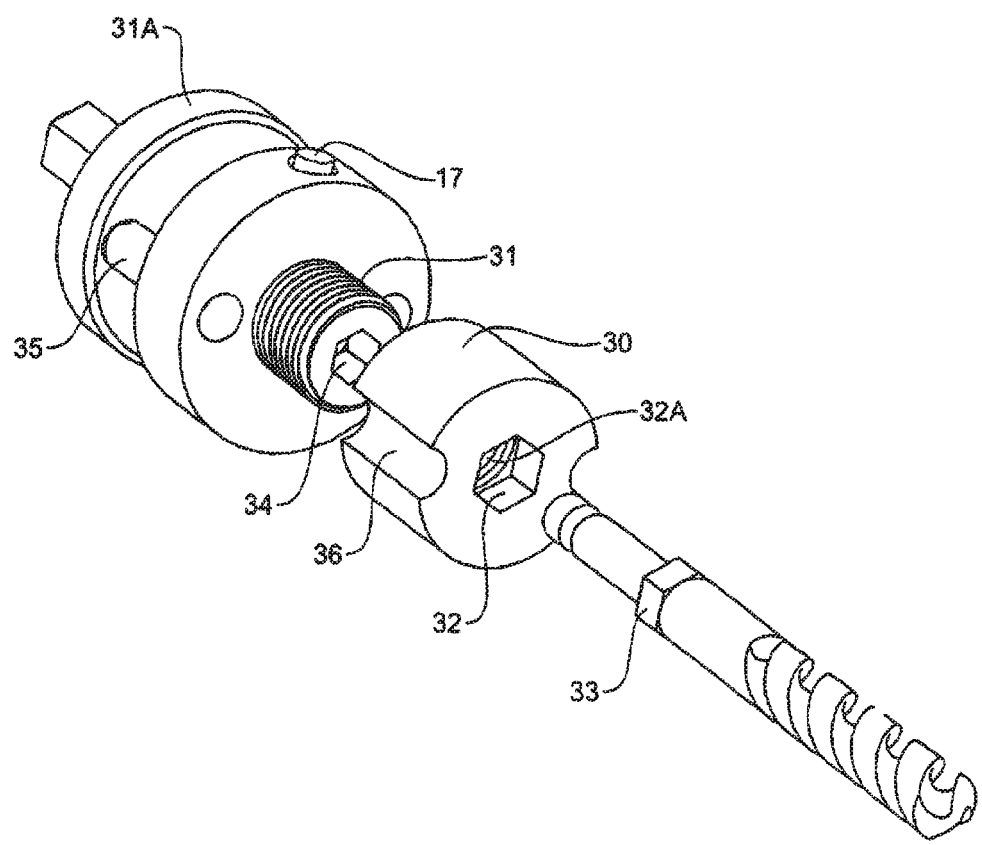
FIG. 19 is a partial break-away view of the embodiment depicted in FIG. 18.
Figure 20:
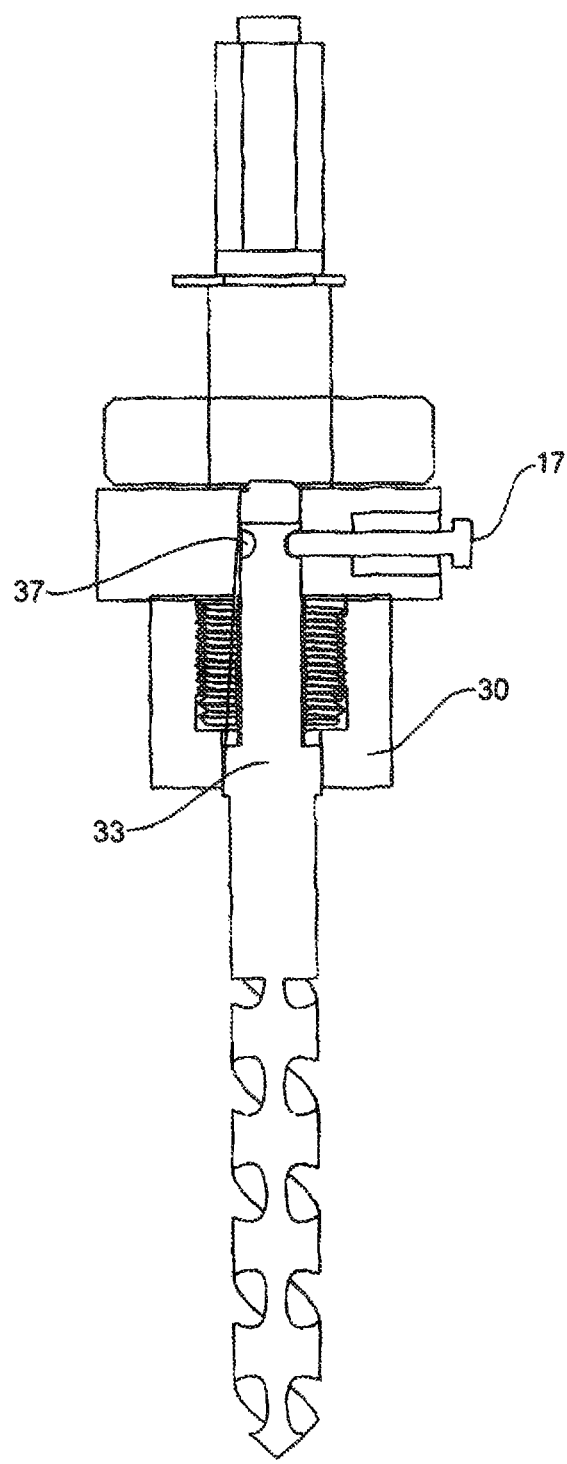
FIG. 20 is a side view of the embodiment depicted in FIG. 18 shown engaged with a chuck arrangement.

FIGS. 19 and 20 show still a further form of the invention whereby a chuck arrangement is shown where the chuck is of the type previously described, the chuck includes, at least one drive pin 35 extending longitudinally and parallel to the longitudinally arranged tool bit accommodating portion of the chuck, and the chuck arrangement further including: an extender element 30 adapted to engage with the hollow spigot 34 where the extender element is attached by way of complementary threads 32A and 31. A mandrel 31A has a threaded portion on the front to engage the extender element and drive member 30 thereby securing the member to the mandrel. Drive pins 35 are moveable from a first withdrawn position to a second extended position to rotatably engage the extender element 30 via shoulders 36. At least one drive shoulder portion 32 engages a drill drive shoulder 33 of the drill bit. Smaller drills can be inserted through the inside thread bore 32A and into engagement with smaller diameter drive shoulder 34 of the mandrel 31A. A pushbutton 17 shown in FIGS. 19 and 20 releasably locks the drill from pulling out. Thus it can be appreciated that drills of varying diameters with suitable drive shoulders can be accommodated with the one mandrel using the extender element.

Figure 21:
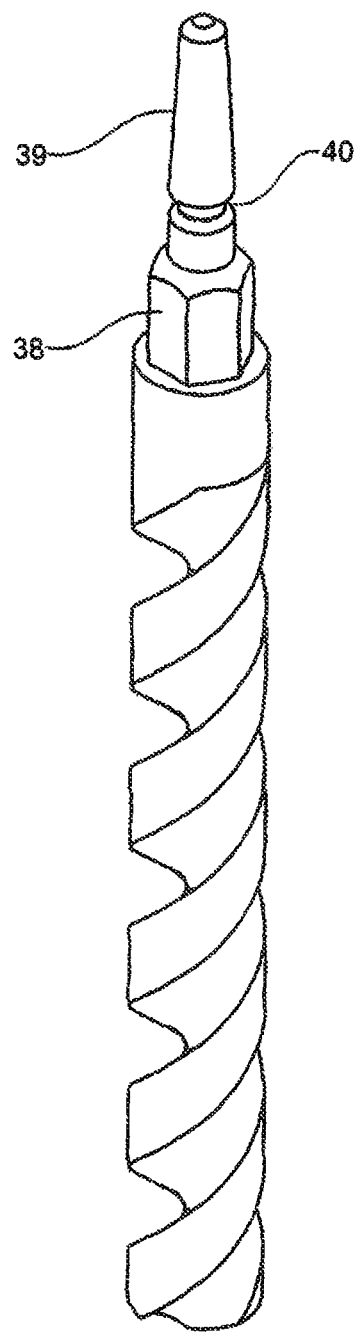
FIGS. 21 & 22 are isometric views of a drill and drive shoulder member with a centering taper according to still yet a further form of the invention.

FIG. 21 shows a further form of the invention including a drill bit having a tapered centering portion 39 which inserts into a corresponding tapered bore in a mandrel (not shown), the drill bit also having a locking groove 40 and a hexagonal driveshaft 38.

The advantage of this embodiment is that the taper is self centering and hence further reduces run-out.

A taper of an angle that is self releasing (a non locking taper) is preferred that can be determined by design or experimentation.

Figure 22:
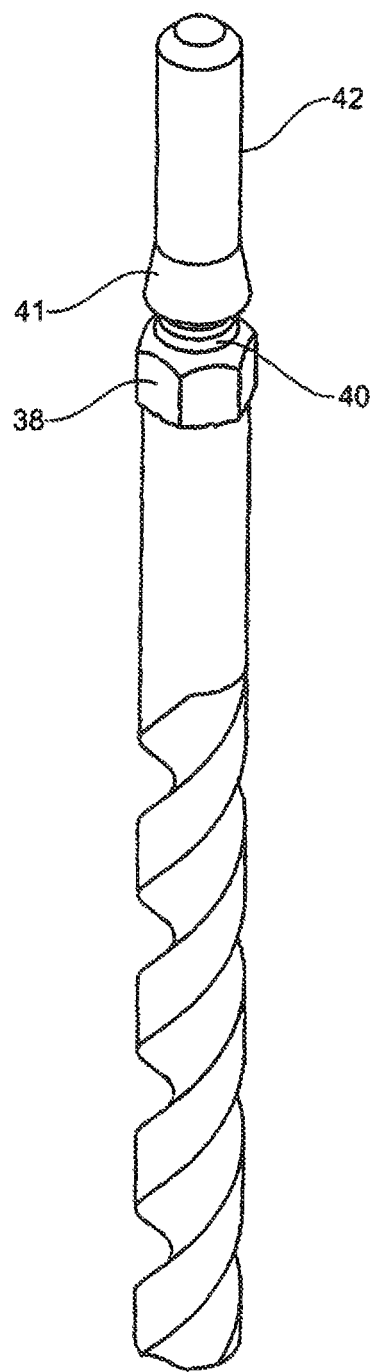

FIG. 22 shows a further preferred embodiment including a centering portion having a straight shaft 42 adjacent a taper 41, a locking groove 40 and a hexagonal drive 38. The taper 41 assists with centering the drill bit and in the preferred form of the invention is of an angle that is non locking.

Figure 23:
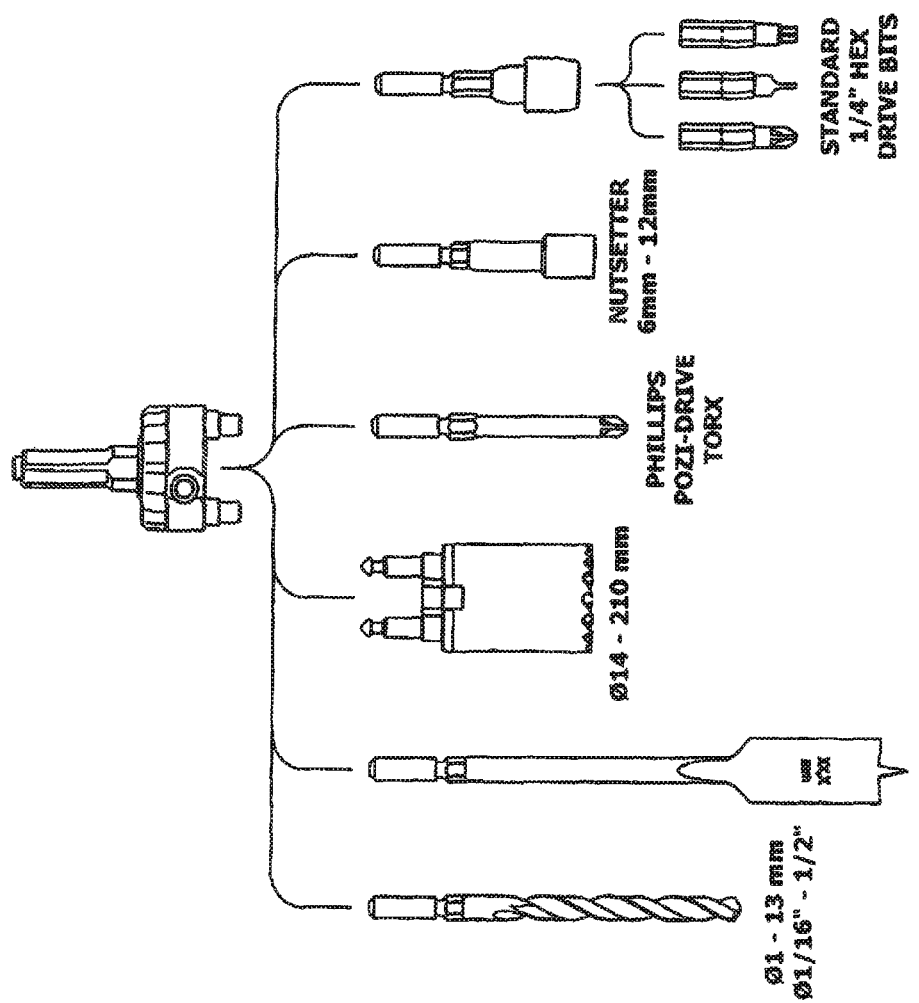
FIG. 23 is an illustration of the variety of tools that can be used with the chuck which is of the types depicted in FIGS. 6 to 13A.

FIG. 23 shows an illustration of the variety of tools that can be used with the chuck which is of the types depicted in FIGS. 6 to 13A, in particular all the drill and driving bits have inserted ends which are arranged in accordance with the positioning and sizing of the end opposite the cutting end having at least one of the following in any order: a centering shaft portion having a constant diameter for multiple drilling portion diameters; a drive shoulder portion; and a lock portion. However, in this illustration the centering shaft portion is at the free end and adjacent the lock portion and followed by the drive shoulder portion. Also illustrated is a hole saw assembly, which is described in detail in US2010/0322730 entitled HOLE SAW ASSEMBLY published Dec. 23, 2010 in the name of Keightley the inventor of the subject patent application, which is incorporated in whole into this specification.

Figure 24:
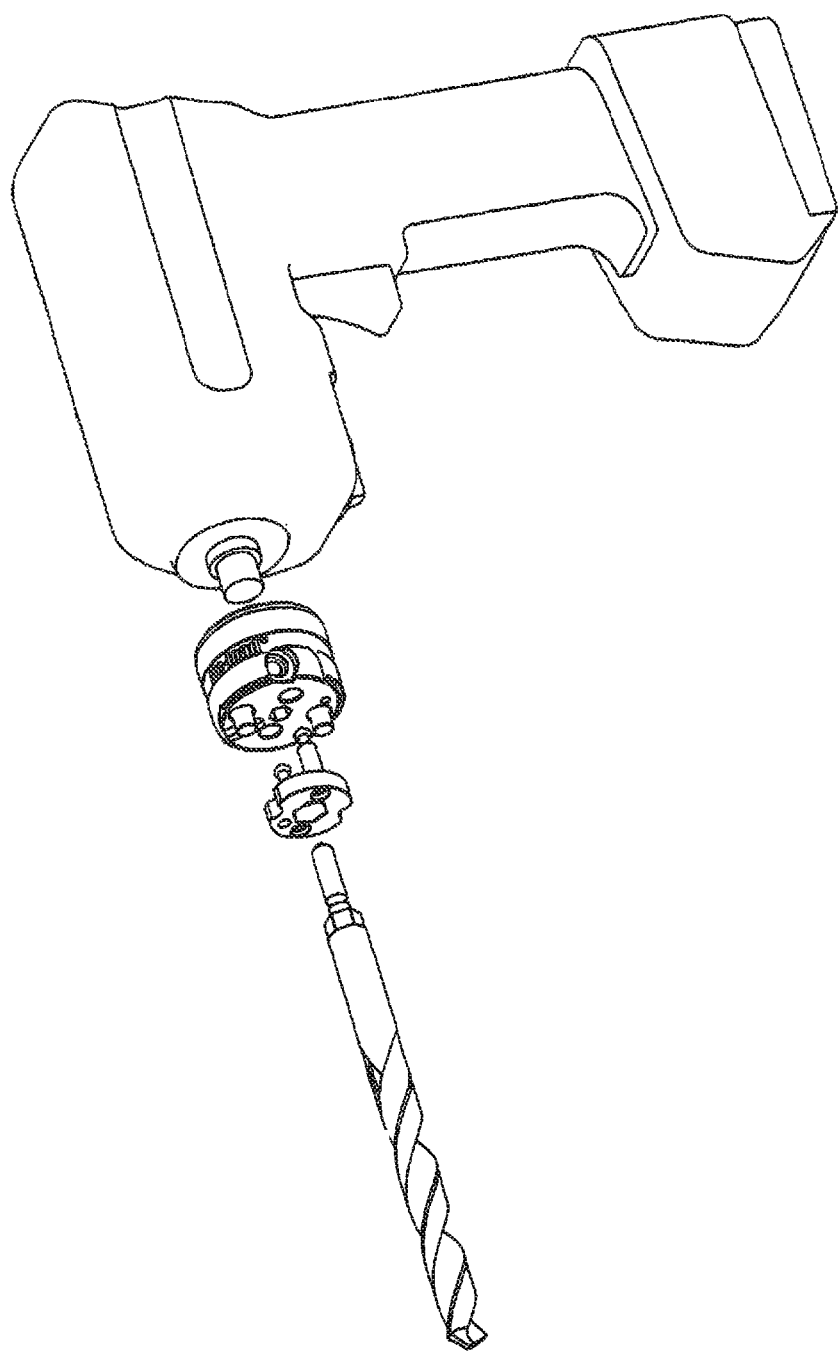
FIG. 24 is a perspective view of a handheld powered drill without the supplied chuck and a chuck replacement which attaches to the same fixings as the supplied chuck.

FIG. 24 is a perspective view of a handheld powered drill without the supplied chuck and a chuck replacement which attaches to the same fixings as the chuck supplied with the handheld powered drill. The direct mounting of the chuck to the drill has the advantage of providing a shorter chuck which can then be used with greater ease in confined spaces, for example, under sinks by plumbers, in motor vehicle interiors and motor bays by mechanics, in switch boards by electricians. Furthermore the total weight of the drill and chuck is lighter and thus can be held for longer and easily finessed into awkward locations.

Figure 25:
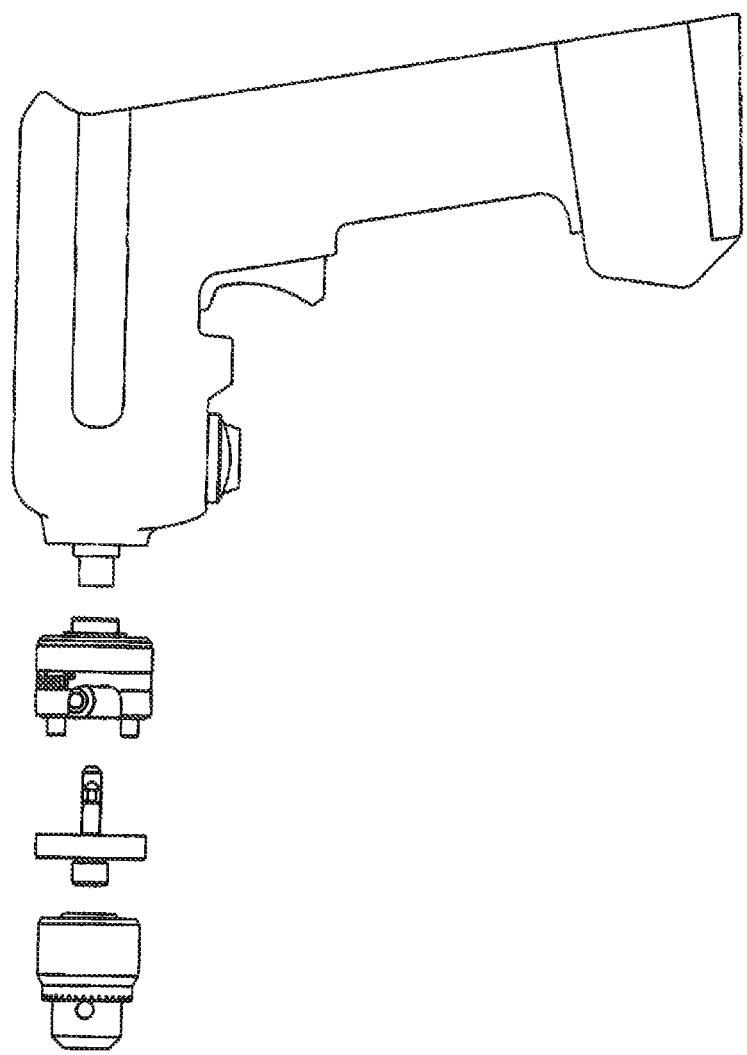
FIG. 25 is side view of the replacement chuck of FIG. 24 and a drill bit adaptor having a collet for holding a standard drill or other tool.

FIG. 25 is side view of the replacement chuck of FIG. 24 and a drill bit adaptor having a collet (for example a standard three jaw chuck) for holding a standard drill or other tool as described in relation to FIG. 14.

Figure 26:
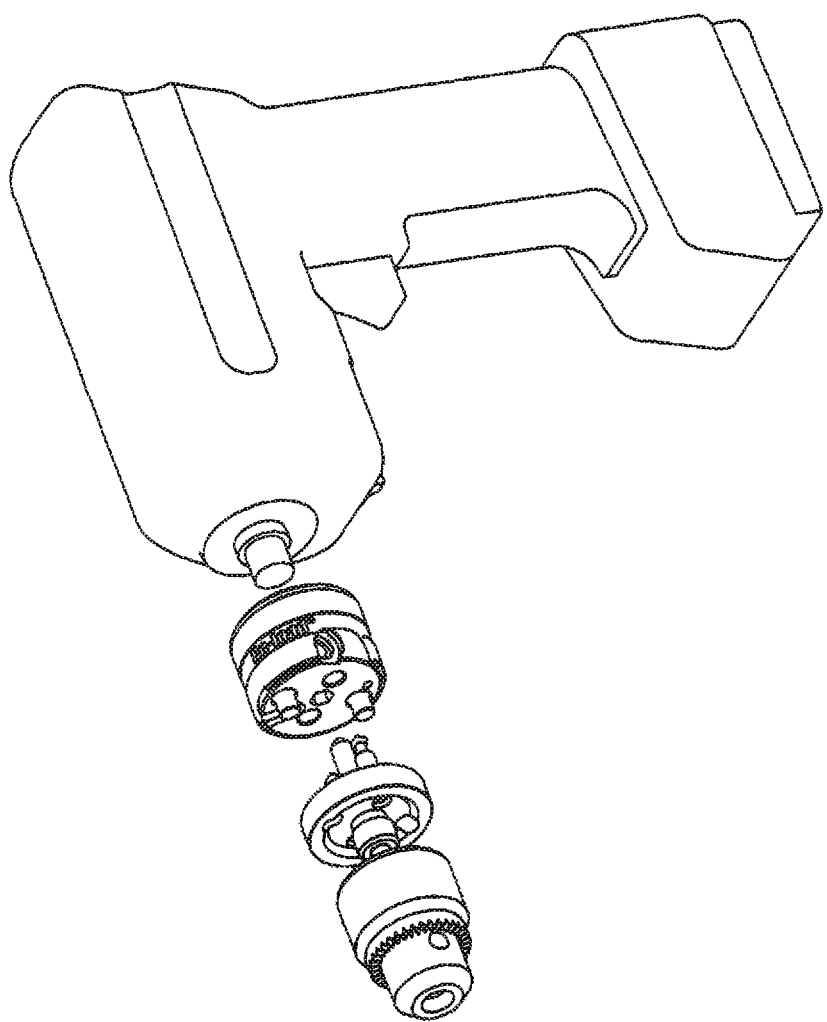
FIG. 26 is a perspective view of the arrangement of FIG. 25.

FIG. 26 is a perspective view of the arrangement of FIG. 25.

Figure 27:
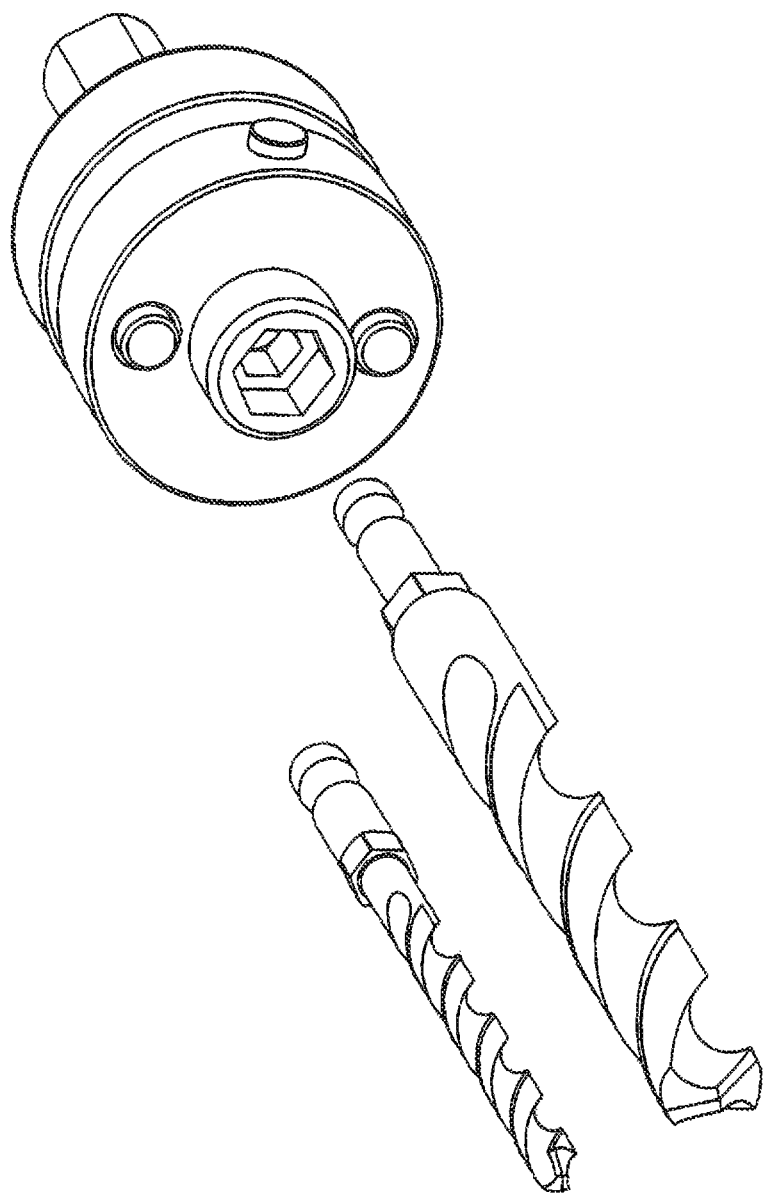
FIG. 27 is a perspective view of a chuck adapted for engaging at least two drive shoulders of the various drills shown.

FIG. 27 is a chuck arbor as described herein having a dual drive shoulder engagement incorporated into the body of the arbor rather than the attachable extender element 30 as depicted in FIG. 19.

Figure 28:
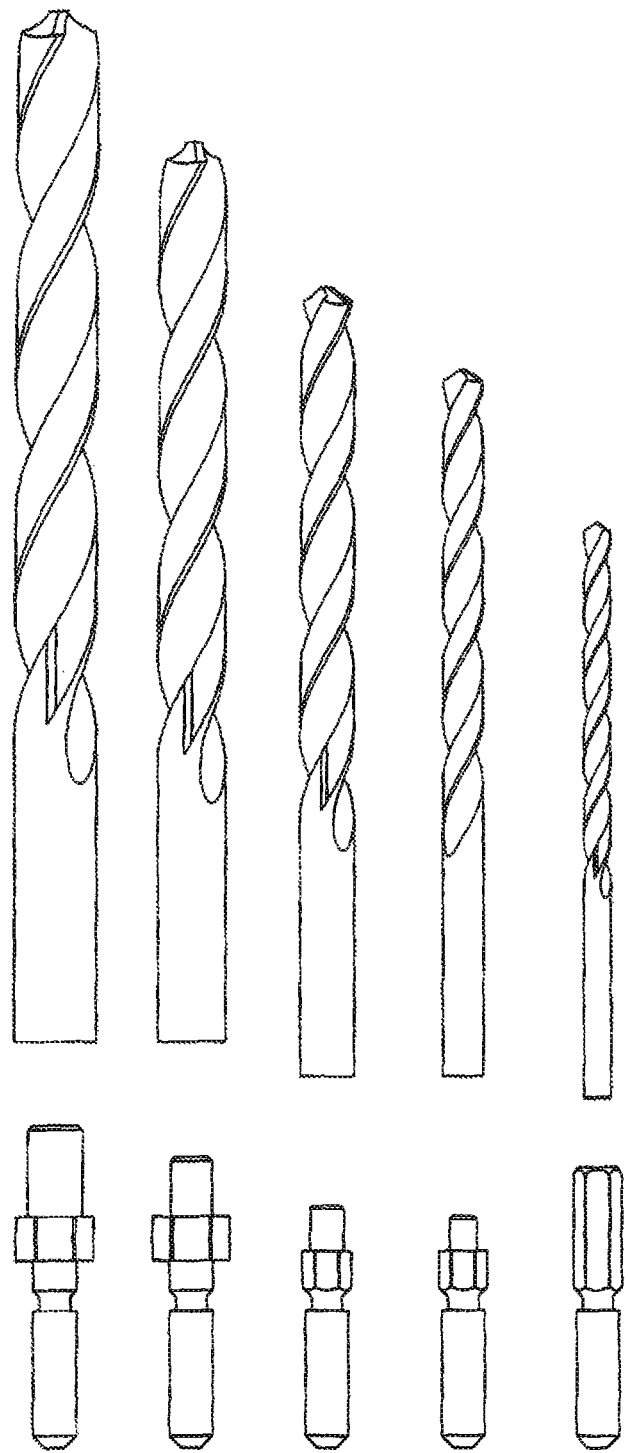
FIG. 28 is a sideview of two-piece drill bits.

FIG. 28 is a sideview of two-piece drill bits which are, once fitted together, have the same characteristics as the drill bits shown in FIGS. 2 to 5 and 21 to 22. The advantage of producing such drill bits in two pieces is the cost savings, as the drilling portion (or a tool portion for that matter) can be produced by conventional means and the second end which is inserted into a chuck according to the those described herein can be produced using known cheaper techniques in known cheaper materials.

Figure 29:
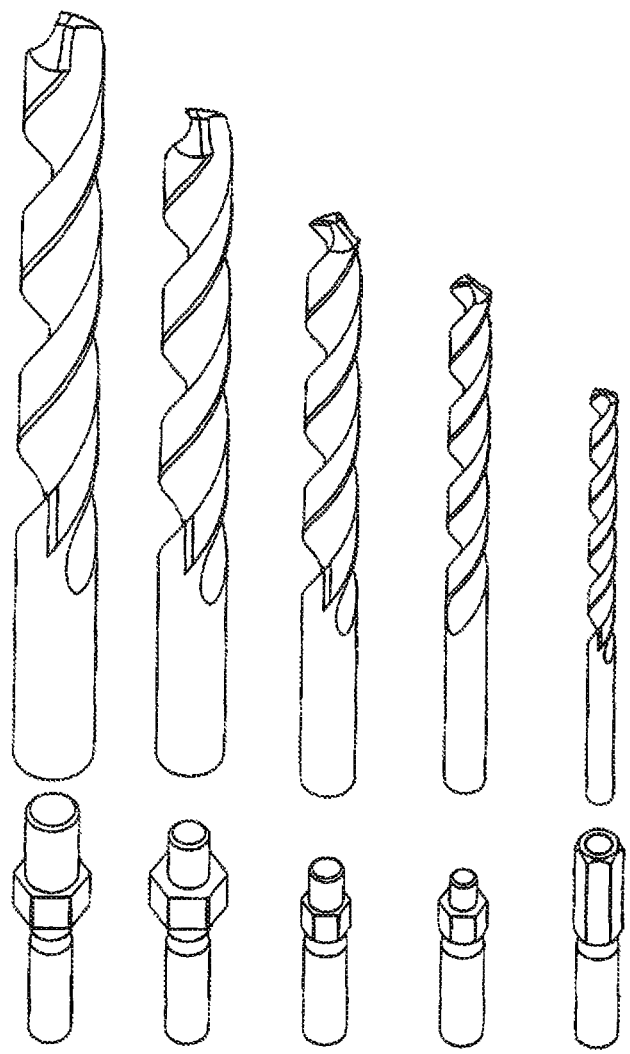
FIG. 29 is a perspective view of the two-piece drill bits of FIG. 27.

FIG. 29 is a perspective view of the two-piece drill bits of FIG. 28.

The reference to any background or prior art in this specification is not, and should not be taken as, an acknowledgment or any form of suggestion that such background or prior art forms part of the common general knowledge of one skilled in the art.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

Further advantages and improvements may very well be made to the present invention without deviating from its scope. Although the invention has been shown and described in what is conceived to be the most practical and preferred embodiment, it is recognized that departures may be made there from within the scope and spirit of the invention, which is not to be limited to the details disclosed herein but is to be accorded the full scope of the claims so as to embrace any and all equivalent devices and apparatus.

The invention claimed is:

1. A chuck for use with a drill bit wherein the chuck comprises:
   a body;
   a drill bit centering arrangement;
   a drill bit retention arrangement; and wherein the drill bit comprises:
a drill bit body having at a first end a cutting face associated with a drilling portion of the drill bit body; and at a second end having at least one of the following in any order:
a centering shaft portion having a constant diameter for multiple drilling portion diameters;
a drive shoulder portion; and
a lock portion;
wherein the chuck's drill bit centering arrangement accommodates the constant diameter centering shaft portion of the drill bit, wherein the drill bit is aligned with the axis of rotation of the chuck to minimize run-out; and
wherein the drill bit retention arrangement is adapted to engage with the lock portion of the drill bit preventing relative longitudinal movement between the drill bit and the body of the chuck; and wherein the chuck further comprises:
a drill bit release mechanism associated with the drill bit retention arrangement operable to disengage the drill bit from the drill bit retention arrangement when a force is applied inwards of the body by a user of the chuck and drill bit, to allow the drill bit to be removed longitudinally from the chuck.

2. The chuck according to claim 1 wherein the drill bit release mechanism includes:
a locking member biased to abut the lock portion of the drill bit; and
a captured pushing member biased to return to a first position and when a force is applied inwards of the body onto the pushing member by a user to move the pushing member from the first position, the pushing member moves inwards of the body of the chuck to move the locking member out of abutment and away from the lock portion of the drill bit, so as to allow the drill bit to be removed longitudinally from the chuck.

3. The chuck according to claim 1;
wherein the chuck further comprises a drill bit engagement portion for engaging the drive shoulder portion of the drill bit to impart rotational forces to the drill bit; and wherein the drill bit engagement portion is adapted to accommodate at least two differently sized drive shoulder portions of different drill bits; and
wherein the drill bit retention mechanism includes:
a locking member biased to abut the lock portion of the drill bit and located within the body so that a drill bit having a lock portion can pass the locking member in one direction but not in the other direction, and the locking member is stopped in a position that partially extends the locking member external of the body of the chuck, and when a force is applied to the locking member inwards of the body and against the bias by a user of the chuck and drill bit, the drill bit can be moved in one direction and removed longitudinally from the chuck.

4. The chuck according to claim 1, wherein the drill bit centering arrangement is sized to allow the movement therethrough of the drive shoulder portion of the drill bit.

5. A chuck for use with a drill bit having a constant diameter centering shaft portion, wherein the chuck comprises:
a body having a drill bit centering arrangement for accommodating the constant diameter centering shaft portion of the drill bit, wherein the drill bit is aligned with an axis of rotation of the chuck to minimize run-out;
a first shoulder adapted to engage a first drive shoulder of the drill bit to drive the drill bit;
a second shoulder of a greater diameter than the first shoulder and adapted to drive an alternate drill bit with a second drive shoulder configured to engage the second shoulder.

6. The chuck according to claim 5, wherein the second shoulder is part of an adapter adapted to engage the chuck.

7. The chuck according to claim 5, further comprising a drill bit retention arrangement adapted to engage with a lock portion of the drill bit preventing relative longitudinal movement between the drill bit and the body of the chuck.

8. The chuck according to claim 7, further comprising:
a drill bit release mechanism associated with the drill bit retention arrangement, said drill bit release mechanism being operable to disengage the drill bit from the drill bit retention arrangement when a force is applied inwards of the body of the chuck by a user of the chuck and drill bit, wherein the drill bit release mechanism allows the drill bit to be removed longitudinally from the chuck.

9. The chuck according to claim 8, wherein the drill bit release mechanism further comprises:
a locking member biased to abut the lock portion of the drill bit; and
a captured pushing member biased to return to a first position when a force is applied inwards of the body onto the pushing member by a user to move the pushing member from the first position, wherein the pushing member moves inwards of the body of the chuck to move the locking member out of abutment and away from the lock portion of the drill bit thereby allowing the drill bit to be removed longitudinally from the chuck.

10. The chuck according to claim 9, wherein the drill bit retention arrangement further comprises:
a locking member biased to abut the lock portion of the drill bit, said locking member being located within the body so that the drill bit having the lock portion passes the locking member of the drill bit release mechanism in one direction but not in an opposite direction, and wherein the locking member of the drill bit release mechanism is stopped in a position that partially extends the locking member of the drill bit release mechanism external of the body of the chuck, and when the force is applied by a user of the chuck and drill bit to the locking member of the drill bit release mechanism inwards of the body and against the bias, the drill bit is movable in the one direction and removed longitudinally from the chuck.

11. The chuck according to claim 5, wherein the drill bit centering arrangement is sized to allow the movement therethrough of the first drive shoulder of the drill bit.

12. A drill bit for use in a chuck according to claim 5, further comprising:
at a first end a cutting face associated with a drilling portion of the body; and at a second end having:
a centering shaft portion having a constant diameter for multiple drilling portion diameters;
a drive shoulder portion; and
a lock portion.

13. A chuck arrangement comprising:
a chuck according to claim 5;
a spigot extending longitudinally from the body of the chuck, the spigot being hollow and the hollow being coaxially aligned with a drill bit accommodating portion of the chuck, the spigot also adapted to engage with the drill bit that has the first drive shoulder of a first size and shape.

14. The chuck arrangement according to claim 13 wherein the spigot is adapted to engage with at least the first drive shoulder or the second drive shoulder and wherein the first and second drive shoulders are differently sized drive shoulders of different drill bits.

* * * * *